H. B. SHERMAN.
SCRAP WINDING REEL.
APPLICATION FILED AUG. 25, 1917.
1,312,057.
Patented Aug. 5, 1919.
2 SHEETS—SHEET 1.
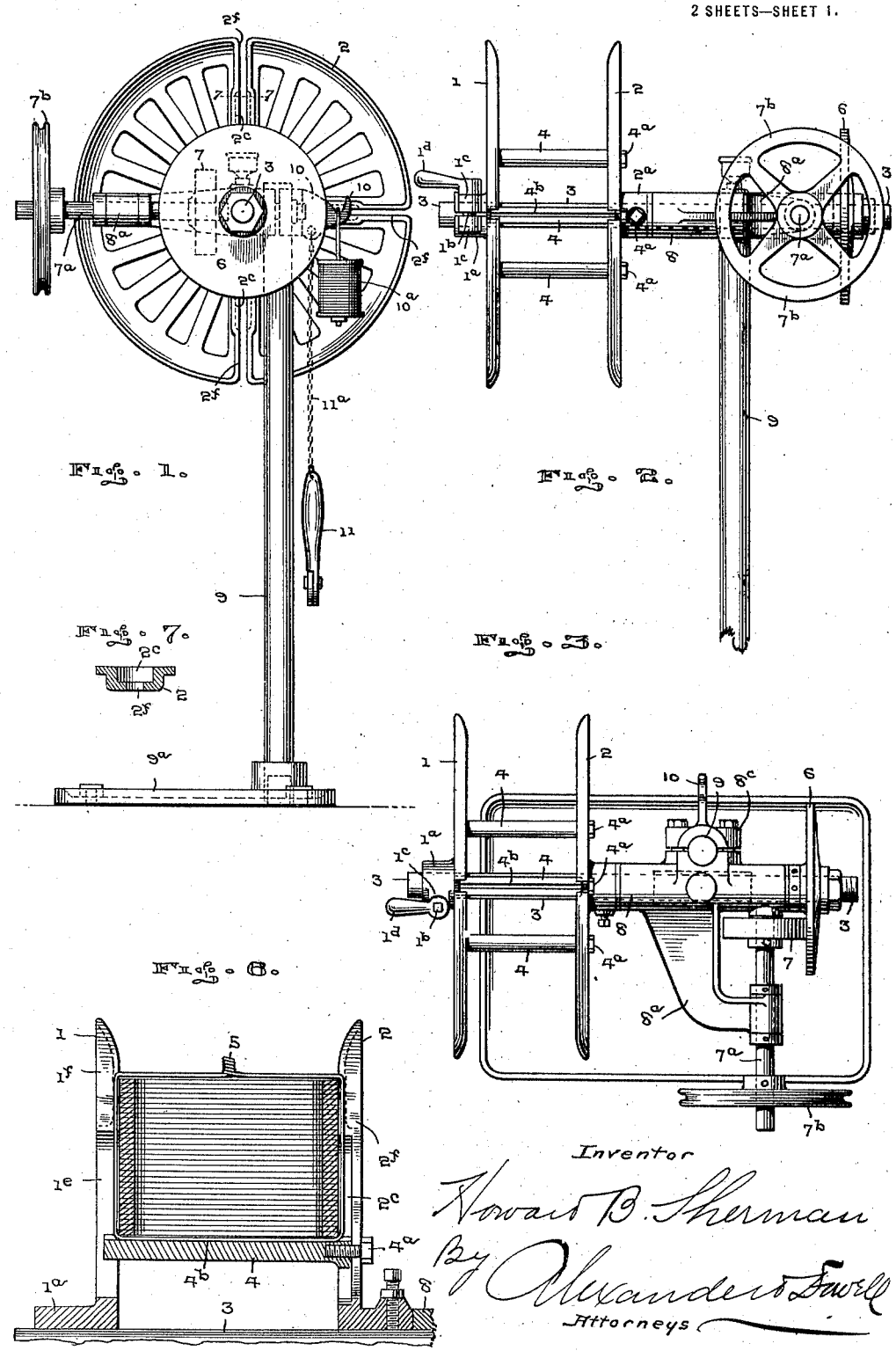

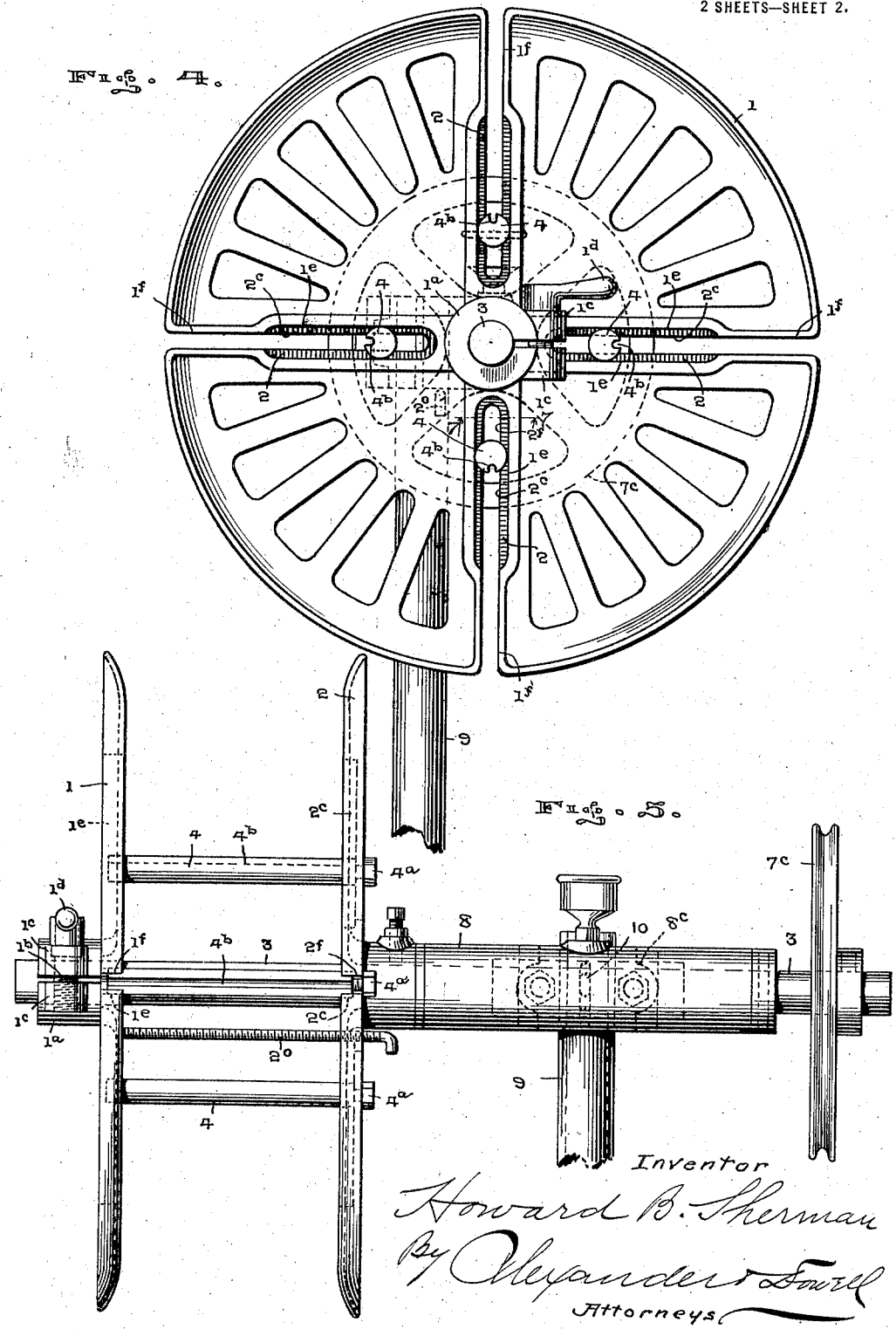

UNITED STATES PATENT OFFICE.

HOWARD B. SHERMAN, OF BATTLE CREEK, MICHIGAN.

SCRAP-WINDING REEL.

1,312,057.         Specification of Letters Patent.         Patented Aug. 5, 1919.

Application filed August 25, 1917. Serial No. 188,166.

*To all whom it may concern:*

Be it known that I, HOWARD B. SHERMAN, a citizen of the United States, residing at Battle Creek, in the county of Calhoun and State of Michigan, have invented certain new and useful Improvements in Scrap-Winding Reels; and I hereby declare that the following is a full, clear, and exact description thereof, reference being had to the accompanying drawings, which form part of this specification.

This invention is an improvement in scrap winding reels, or machines for bundling the waste stock obtained in manufacturing articles from metal ribbons or strips supplied to the operating machines, which cut blanks or portions from the strips and operate thereupon while the remainder or waste portion of the strip is discharged as scrap.

The objects of the present invention are to provide a novel compound reel for winding up such scrap as it issues from the operating machine and prevent it littering the floor and interfering with the machine during the operation thereof; and to enable the wound scrap to be readily tied up in bundles before same is rewound from the reel, and to enable the bound bundle of scrap to be readily removed from the reel.

The principal features of my invention are enabling the binding wires or ties to be easily placed around the scrap while it is on the reel so that such scrap can be bound together and kept from flying apart when removed from the reel; and enabling the tied bundle of scrap to be readily removed from the reel.

I will explain the invention with reference to the accompanying drawings, in which—

Figure 1 is a front view of a scrap winder embodying my invention.

Fig. 2 is a side elevation thereof, partly broken away.

Fig. 3 is a plan view of Fig. 1.

Fig. 4 is an enlarged side view and Fig. 5 a front view partly broken away, of a slightly modified form of machine.

Fig. 6 is a detail sectional view illustrating the manner of tying the scrap into a bundle while on the reel.

Fig. 7 is a section on the line 7—7 of Fig. 4.

The reel portion of the scrap winder consists of opposite side members 1 and 2, and fingers 4 mounted on a rotatable shaft 3.

The member 2 has a hub $2^a$ which is preferably fixedly mounted on a supporting shaft 3; and the opposed member 1 has a hub $1^a$ by which it is also mounted on the shaft 3 opposite the member 2; preferably this hub $1^a$ is split and may be clamped upon the shaft by means of a screw $1^b$ which may be operated by a handle $1^d$ and engages lugs $1^c$ on opposite sides of the split in the hub, see Figs. 4 and 5. By properly turning handle $1^d$ the hub $1^a$ can be clamped fast on shaft 3, or may be loosened so that the member 1 can be slid endwise on or off the shaft 3.

The member 2 is provided with a plurality of radial slots $2^c$ in which are adjustably engaged the ends of the reel fingers 4, which may be secured to member 2 in any suitable manner, as by means of bolts $4^a$, as shown in the drawings. The series of fingers 4 can be adjusted radially toward or from the shaft 3 so as to make a larger or smaller opening in the bundle of scrap wound thereupon. Each of these fingers 4 is preferably provided with a longitudinal groove $4^b$ in its outer side for a purpose hereinafter explained.

The member 1 is also provided with radially disposed slots $1^e$, coinciding with the slots $2^c$ and with which the free ends of the fingers 4 freely engage. Said fingers may project more or less through the slots $1^e$ in the member 1, so that the member 1 can be adjusted toward or from the member 2 so as to vary the width of the reel, or space between members 1 and 2, according to the width of the scrap to be wound.

A suitable limiting stop is provided to limit the movement of the member 1 toward the member 2 and keep the members separated the proper distance to suit the scrap being wound. This stop is shown as a threaded rod $2^o$ tapped through the member 2 and extending parallel with the shaft 3.

At the outer end of one, or preferably each, of the slots $2^c$ is a radial slot $2^f$, which extends from the outer end of the related slot 2 to and through the periphery of the member; the slots $2^c$ and $2^f$ practically forming an open slit in the member 2 extending from the fingers 4 to the periphery of the member. Similarly the member 1 is provided with slots $1^f$ extending from the outer end of the slots 1ᵉ to the periphery of the member, forming open slits extending from the fingers 4 to the periphery of the member 1.

The object of such open slits and the grooves 4ᵇ in the fingers 4 is to enable the scrap wound on the reel to be tied into a bundle while on the reel. For this purpose after sufficient scrap has been wound upon the reel a suitable tie—such as a wire, can be slipped through the bundle by passing the end of the tie through a channel 4ᵇ in a finger, then the ends of the tie can be brought around and through the opposed slots 1ᶠ, 2ᶠ, and fastened together in any suitable manner; such a tie being indicated at 5 in Fig. 6. In the machine shown four such ties could be applied to the bundle.

After the bundle of scrap is tied the member 1 is loosened on the shaft 3 and slid endwise off the shaft; then the bundle of scrap is removed from the fingers 4; then the member 1 may be replaced and a fresh bundle of scrap wound upon the reel.

The shaft 3 may be rotated during the winding operation in any suitable manner. As shown in Figs. 1 to 3 shaft 3 carries a friction disk 6 which is engaged by a friction pulley 7 on a counter shaft 7ᵃ journaled in a bracket 8ᵃ on the supporting casting 8, attached to a vertical standard 9 rising from a suitable base 9ᵃ. The casting 8 may be adjustably mounted on the standard 9 by means of a split clamp indicated at 8ᶜ in the drawings. Shaft 7ᵃ carries a pulley 7ᵇ which may be driven by a cord or belt from any suitable part of the operating machine, not shown. If desired a pulley 7ᶜ might be directly mounted on the shaft 3, as indicated in Figs. 4 and 5.

For convenience a bracket 10 may be attached to the clamp 8ᶜ or other suitable part of the machine, and a coil of wire 10ᵃ can be hung thereon to supply the ties for binding the scrap and a wire cutting pliers 11 of any suitable type may be attached to bracket 10 by a chain 11ᵃ (see Fig. 1).

My winding reel can be easily adjusted to wind any width of scrap, and no matter what thickness of scrap is wound on the reel, it can be easily tied into bundles as above explained while the reel members 1 and 2 are in fixed relative position; and after the bundle is so tied the outer reel member can be taken off the shaft, the bundle of scrap removed, and then the reel member 1 replaced and another bundle of scrap wound on the reel.

I claim:

1. In a scrap winding reel, the combination of opposite relatively adjustable reel members provided with radially disposed slots for the accommodation of bundle ties; and radially adjustable reel fingers extending between the members and engaged with said slots and provided with longitudinal grooves for the ties.

2. In a scrap winding reel, the combination of opposite relatively adjustable reel members provided with radially disposed slots for the accommodation of bundle ties; radially adjustable reel fingers extending between the members and engaging said slots and provided with longitudinal grooves for the ties; means for adjustably attaching said fingers to one member; and means for removably fastening the other member.

3. In a scrap winding reel, the combination of opposite relatively adjustable reel members provided with radially disposed open ended slots for the accommodation of bundle ties; radially adjustable reel fingers extending between the members and engaging said slots and provided with longitudinal grooves for the ties; and means for limiting the juxtaposition of said members.

4. In a scrap winding reel a rotatable shaft; opposite relatively adjustable reel members thereon provided with radially disposed slots open at their outer ends for the accommodation of tying wires; radially adjustable fingers extending between the said members and engaging said slots and provided with longitudinal grooves for the ties; means for adjustably attaching said fingers to one member; means for detachably attaching the other member to the shaft; and means for limiting the juxtaposition of said members.

5. In a scrap winding reel, the combination of a rotatable shaft, opposite relatively adjustable reel members thereon provided with radially disposed slots; radially adjustable reel fingers extending between the members and engaged with said slots provided with longitudinal grooves; and means for rotating said shaft.

6. In a scrap winding reel, the combination of a rotatable shaft; opposite relatively adjustable reel members thereon provided with radially disposed slots; radially adjustable reel fingers extending between the members and engaged with said slots and provided with longitudinal grooves for the ties; means for limiting the juxtaposition of said reel members and means for rotating the shaft.

7. In a scrap winding reel, the combination of opposite relatively adjustable reel members having radially disposed open ended slots extending therethrough for the accommodation of bundle ties; with adjustable reel fingers engaged with said slots and extending between the members.

8. In a scrap winding reel, the combination of opposite reel members provided with radially disposed slots for the accommodation of bundle ties; radially adjustable reel fingers extending between the members and engaged with said slots; and means for removably fastening the said fingers to one member.

9. In a scrap winding reel, the combination of opposite relatively adjustable reel members provided with radially disposed open slots for the accommodation of bundle ties; radially adjustable reel fingers extending between the members and engaging said slots; and adjustable means for limiting the juxtaposition of said members.

10. In a scrap winding reel a rotatable shaft; opposite adjustable reel members thereon provided with radial open ended slots for the accommodation of tying wires; radially adjustable fingers extending between the said members; means for adjustably attaching said fingers to one member; means for detachably attaching the other member to the shaft; and means for limiting the juxtaposition of said members.

11. In a scrap winding reel, the combination of a rotatable shaft, opposite reel members thereon provided with radially disposed slots; adjustable reel fingers extending between the members adjacent said slots and provided with longitudinal grooves registering with the slots; and means for rotating said shaft.

In testimony that I claim the foregoing as my own I affix my signature.

HOWARD B. SHERMAN.

Copies of this patent may be obtained for five cents each, by addressing the "Commissioner of Patents, Washington, D. C."